United States Patent [19]

Warren

[11] 4,134,333
[45] Jan. 16, 1979

[54] METHOD AND MEANS FOR TRANSFERRING ROWS OF ARTICLES

[75] Inventor: William H. Warren, Omaha, Nebr.

[73] Assignee: Henningsen Foods, Inc., White Plains, N.Y.

[21] Appl. No.: 689,999

[22] Filed: May 26, 1976

[51] Int. Cl.² .............................................. A01J 11/00
[52] U.S. Cl. ........................................ 99/498; 99/577
[58] Field of Search ................................. 99/498–500, 99/577; 198/424, 478, 479

[56] References Cited

U.S. PATENT DOCUMENTS

| 1,775,381 | 9/1930 | Angus | 198/478 |
| 2,354,308 | 7/1944 | Everett | 198/478 |
| 3,039,587 | 6/1962 | Pullmann | 198/478 |
| 3,137,330 | 6/1964 | MacLagan | 99/498 |
| 3,203,458 | 8/1965 | Shelton | 99/498 |
| 3,455,356 | 7/1969 | Classen | 99/498 |
| 3,480,056 | 11/1969 | Willsey | 99/498 |

Primary Examiner—Christopher K. Moore
Attorney, Agent, or Firm—Holland, Armstrong, Wilkie & Previto

[57] ABSTRACT

A method and means are described for transferring rows of articles having one alignment on a first support to a second support where the rows have a differing alignment. Preferred method and means are described for transferring straight rows of articles, such as eggs, from a row conveyor to a processing machine having a turret or other curved article supporting arrangement. The transfer means includes slidable mountings for the article supports on the turret and a cooperating camming means which temporarily moves the supports into a straight line when they are adjacent to the row conveyor for receiving the straight row of articles.

9 Claims, 5 Drawing Figures

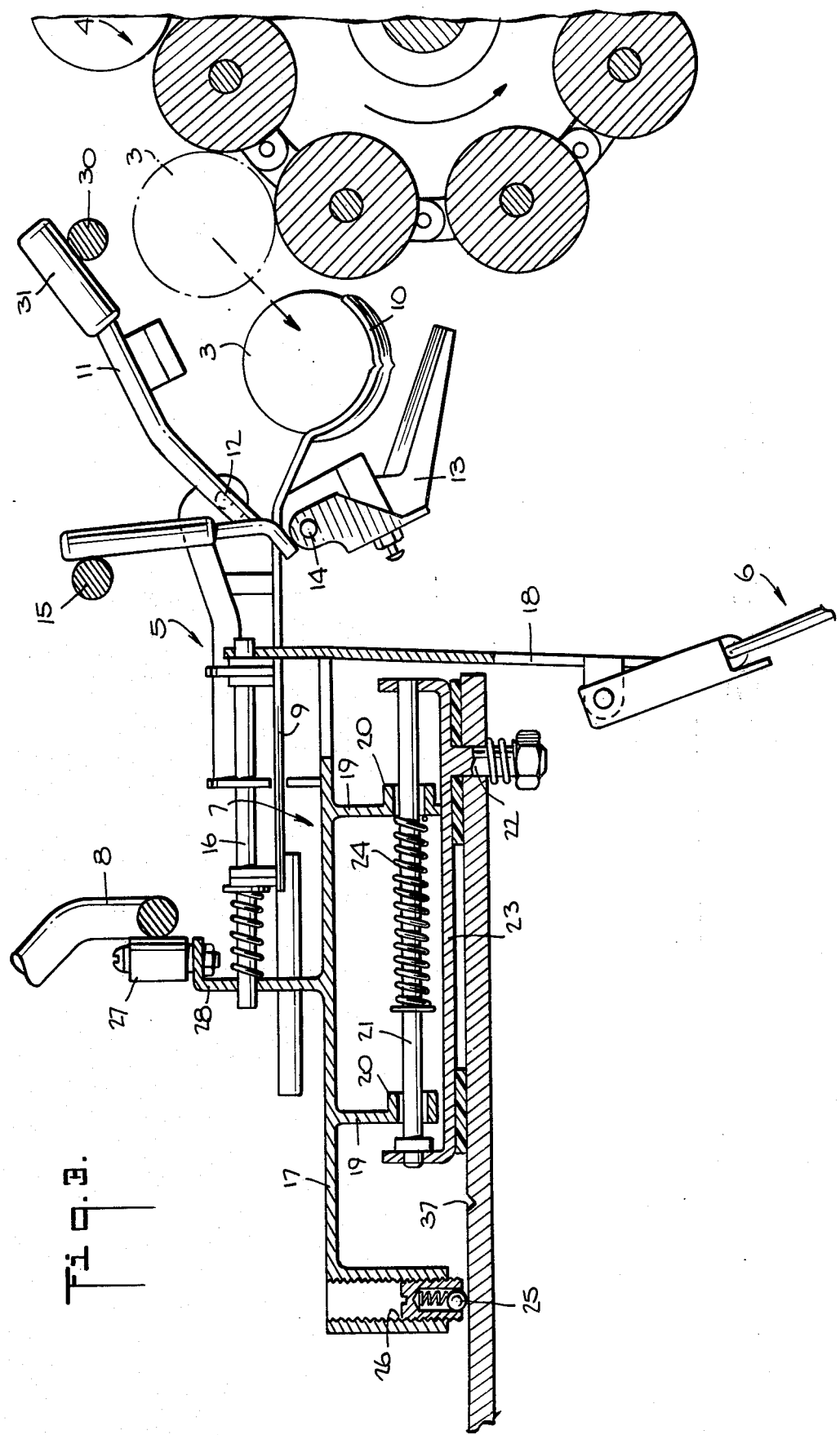

METHOD AND MEANS FOR TRANSFERRING ROWS OF ARTICLES

BACKGROUND OF THE INVENTION

The present invention relates to the automatic transfer of articles from one support to another and more particularly to an improved means for transferring straight rows of articles, such as eggs, from a roller conveyor to an egg breaking or other egg processing machine where the egg supports are arranged in a circle at the edge of the machine turret or other moving support.

Egg processing operations, such as egg cracking and separating operations, are now performed at high speed with automated machinery. The feeding of the eggs into the automated line for washing and inspecting preferably utilizes row conveyors. After being loaded onto the conveyor, the eggs are carried in moving and straight rows through the washing and inspecting equipment and are thence transferred to the cracking or other processing machinery.

Where the processing machine includes egg supports which are aligned in a straight row adjacent the egg feeding conveyor, the transfer is easily accomplished. Where the eggs are fed to a circular machine, such as a machine having the egg supports mounted at the edge of a turret, the transfer has heretofore been relatively complicated and has been done in an operation requiring the eggs to be handled a number of times and individually loaded onto the turret supports. This transfer of the eggs from rows to egg supports moving along a curved path has therefore required relatively complicated and space consuming apparatus and has limited the speed at which the transfers may be efficiently made.

An object of the present invention is to permit the transfer of the articles from straight rows to a curved line of articles.

Another object of the present invention is to provide an improved method and means for transferring rows of articles between article supports having differing row alignments.

Another object of the present invention is to provide a method and means for transferring straight rows of articles to article supports having a normally curved alignment.

Another object of the present invention is to provide an improved method and means for transferring eggs from row conveyors to curved or generally circular conveyors or egg processors.

Another object of the present invention is to provide an improved method and means for transferring rows of eggs.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIGS. 2 and 3 are enlarged vertical sectional views taken along lines 2—2 and 3—3 on FIG. 1, respectively.

DESCRIPTION OF THE PREFERRED EMBODIMENT

The method and apparatus of this invention will now be described in connection with an egg processing operation where eggs are transferred from a row conveyor to an egg breaking and separating machine using a circular turret for supporting egg cracking and separating heads. It is clear, however, that the method and means of the invention may be used for other articles or operations for transferring a straight row of articles to a row of article supports which may normally have an arcuate or other curved alignment.

In the description which follows, an egg breaking machine is referred to in which egg cracking heads together with related separating means are mounted on a circular turret or other conveyor. The conveyor carries a large number of the cracking heads around a closed path as cams and other operating members work with the cracking heads. Additional details, as far as the operation of the individual heads is concerned, are given in U.S. Pat. Nos. 3,455,356 dated July 15, 1969 and 3,589,419 dated June 29, 1971, which show egg cracking and separating heads mounted on endless chains. These heads may be used with the method and apparatus of the present invention but are not a part of it. Prior U.S. Pat. Nos. 3,133,569 dated May 19, 1964 and 3,203,458 dated Aug. 31, 1965 show machines where egg cracking assemblies are mounted on circular supports. The transfer apparatus of this invention will now be described for use in an egg cracking and separating machine where the egg cracking assemblies are mounted upon a circular support such as a turret or other form of conveyor and where the assemblies are carried along an arcuate path during the cracking and other operations. Such a turret is identified in FIG. 1 at 1 which illustrates a large number of cracking and separating assemblies 2 mounted at the periphery of the turret 1.

Figure 1:
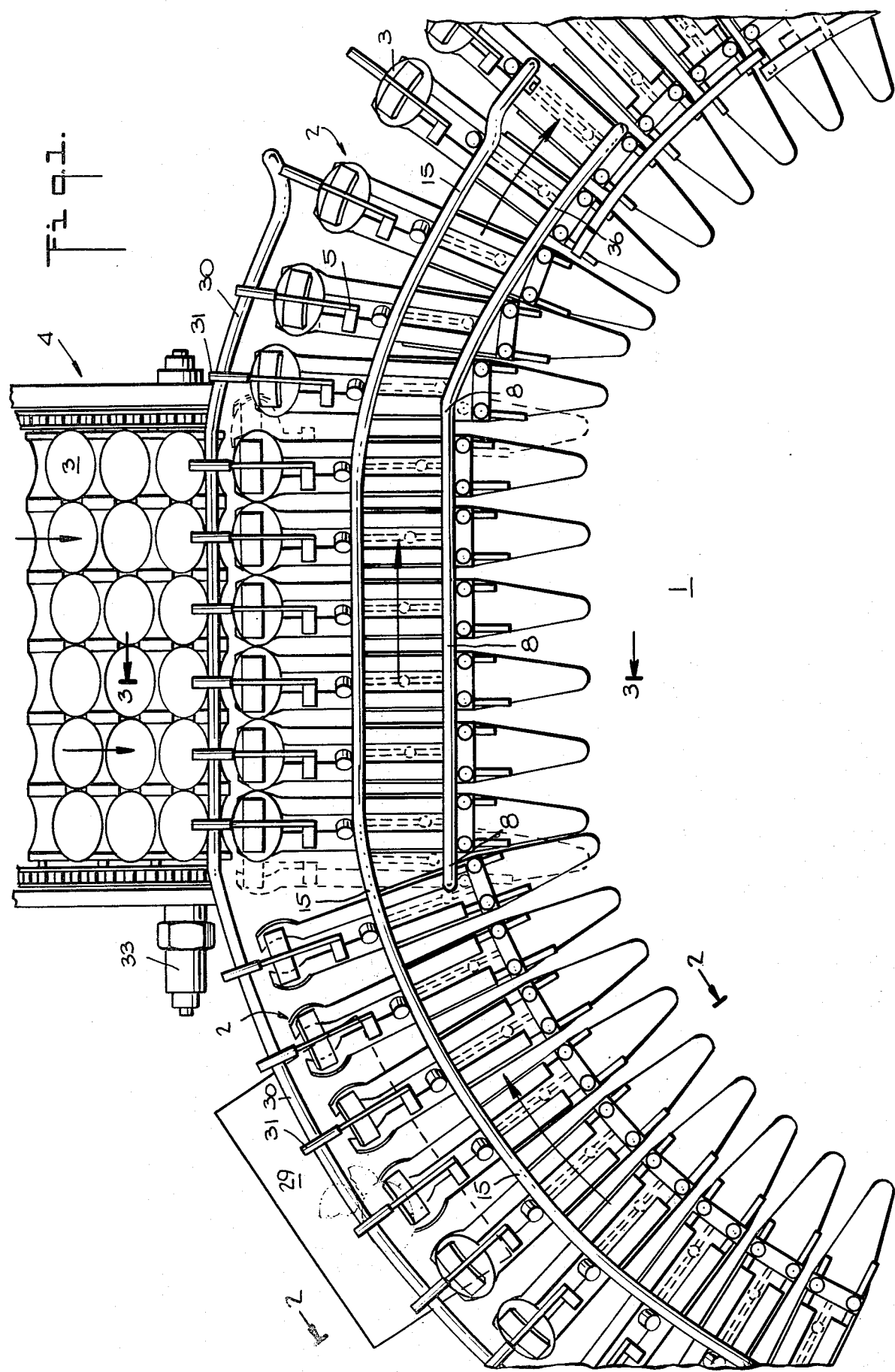
FIG. 1 is a top plan view illustrating a preferred embodiment of the transfer method and apparatus.

Since the circular form of such a turret 1 supports the assemblies 2 in an arcuate alignment, rows of eggs 3 cannot be transferred from a row conveyor 4, as illustrated in FIG. 1, directly to the assemblies 2. When the eggs 3 at the center portions of the rows would be at a convenient transfer distance, the eggs 3 at the opposite ends of the rows would be spaced too far from the assemblies 2 to permit an effective transfer. This problem has been solved in prior machines by including relatively complicated intermediate transfer means between the row conveyors and the turrets including means to change the rows of eggs into a single file feeding line loading one egg at a time.

The method and apparatus of the present invention provide means on the supporting conveyor or turret 1 to cause the cracker and separator assemblies 2 to be moved into a straight line or chord as they are carried past the row conveyor 4. This method and means will now be described in detail.

Figure 2:
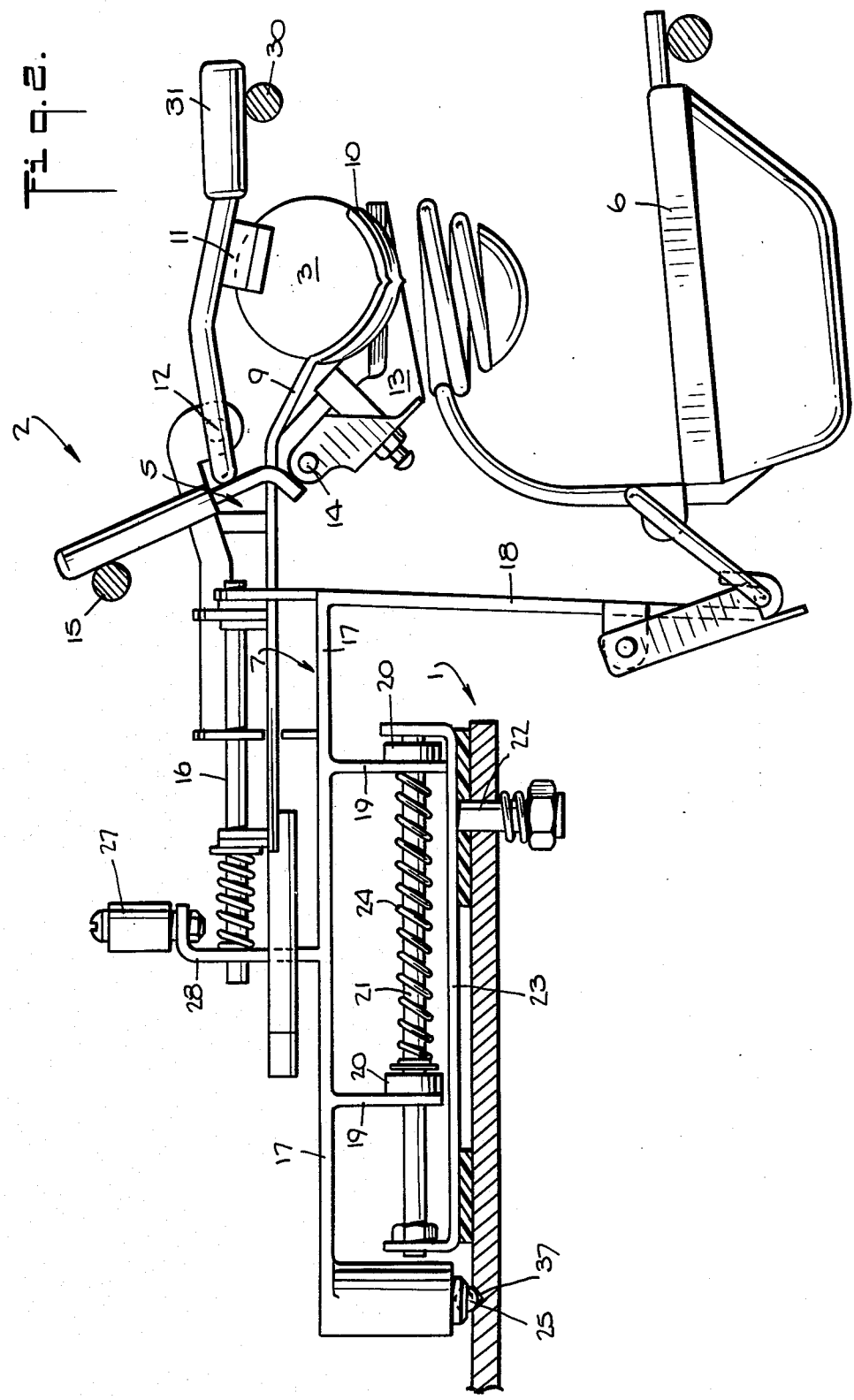
Figure 5:
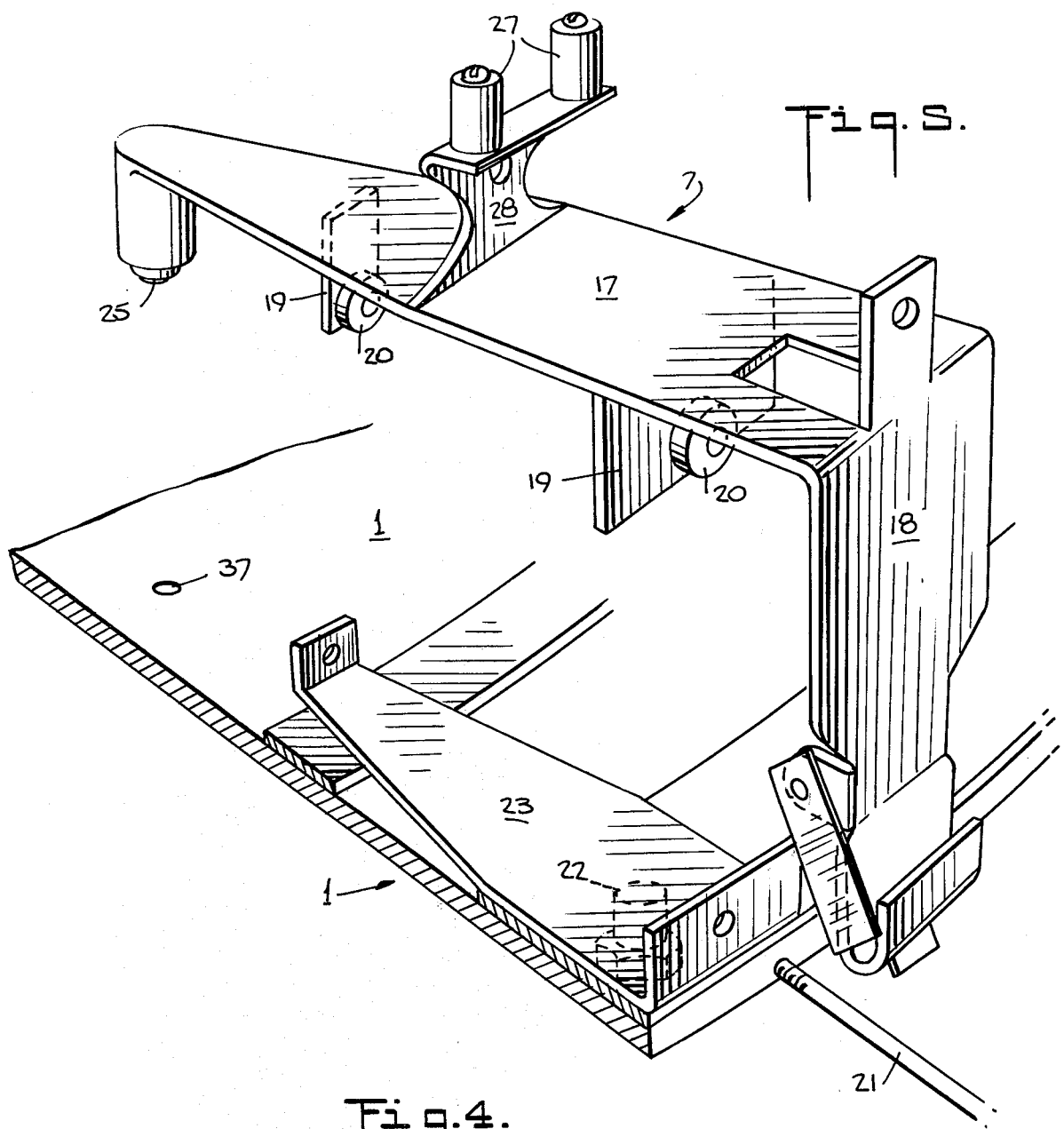
FIG. 5 is an exploded perspective view illustrating a support means in accordance with the invention.

FIG. 2 illustrates an assembly 2 comprising a cracker assembly 5 and a separator assembly 6 supported on a common mount 7 in accordance with the present invention. The mount, illustrated generally at 7, supports the cracker assembly 5 on the support turret 1 and provides the transfer aligning operation in cooperation with a chord or aligning cam 8 as will now be more fully described.

Figure 4:
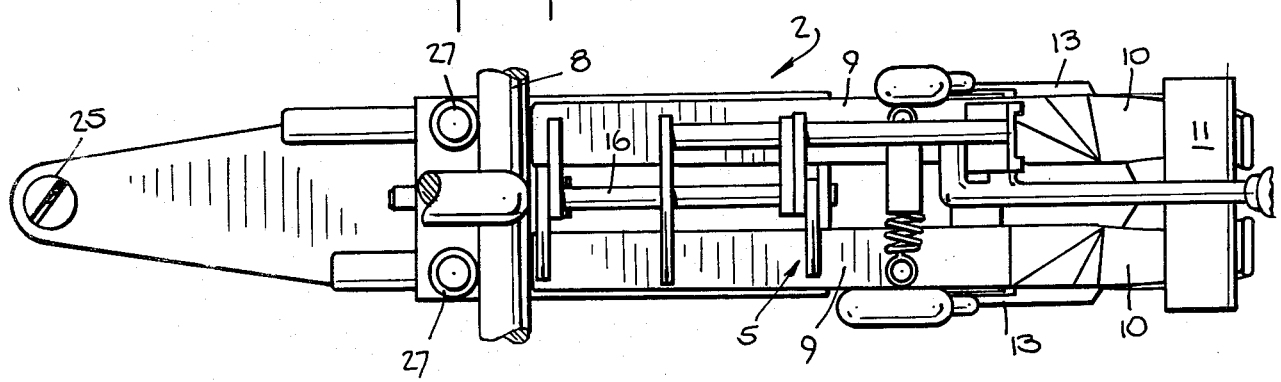
FIG. 4 is an enlarged detailed plan view illustrating a cracker head in accordance with the present invention.

Each cracker assembly 5 comprises, for example, a pair of pivotally connected egg support arms 9 (FIG. 4) having cup-like outer ends 10 for receiving the eggs 3. A cover or clamp arm 11 is pivotably attached at 12 to hold the eggs 3 in position during the egg cranking and draining operations. A pair of knives 13 is also pivotally mounted at 14 on the support arms 9 for operation by a cocking cam 15 to pierce the egg shells at the proper time prior to the egg opening operation when the egg support arms 9 are pivoted about the pivot pin 16 to draw the egg contents into the egg separator assemblies 6. These portions of the cracker and separator assemblies 2 are described for background information and do not form part of the present invention and may vary in accordance with the particular process being formed by a processing machine.

The above referred to cracker and separator units 2, whatever their exact form may be, are supported on the turret 1 by the mount 7. The mount 7 includes a top plate 17 for mounting the cracker assembly 5 and a depending side plate 18 for mounting the egg separator assembly 6. A pair of bearing arms 19 depend from the top plate 17 and include bearings 20 which are slidably mounted upon an elongated mounting pin 21. The pin 21 is pivotally attached to the turret 1 by a pivot 22 on a mount base 23 permitting the mount base 23 and the attached mount 7 to turn about the axis of the pivot 22 as will be more fully described below. In addition to this pivotal motion, a movement of each mount 7 generally radially of the turret 1 is provided by movement of the plate 17 on the mounting pin 21 against the force of the coil spring 24. A spring loaded ball plunger 25 threadedly coupled at 26 to the top plate 17 cooperates with a detent on the turret 1 to releasably hold the mount 7 in its normal radially aligned operating position. A pair of cam followers 27 in the form of rollers or low friction members are mounted on a support arm 28 to control the position of the mount 7 and the attached cracker and separator units 2 in cooperation with the chord cam 8.

At the left side of FIG. 1, the cracker and separator units 2 are illustrated being moved by the turret 1 past a shell removal station 29 at the termination of the cracking and draining operation. The empty cracker assemblies 5 are now ready to be loaded with eggs 3 as the cracker assemblies 5 are carried to a position opposite the row conveyor 4. An elongated clamp guide 30 engaging low friction bearings 31 on egg clamps 11 raises the clamps 11 from a closed position, as illustrated in FIG. 2, to an open or egg receiving position, as illustrated in FIG. 3. At the same time, an elongated knife cocking cam 15 lowers the knives 13 clear of the egg support arms 9. The transfer operation of rows of eggs 3 from the row conveyor to a row of cracker assemblies 5 on the turret 1 is done by periodical advance of the row conveyor to dump one row of eggs into an empty adjacent row of cracker assemblies. This is conveniently done by synchronizing the conveyor drive to the turret movement, for example, by using a ratchet drive 33 to couple the turret drive to the conveyor drive.

The elongated chord cam 8 has also acted to align the egg receiving cracker assemblies 5 in a straight row at the transfer position for the above described transfer. The chord cam 8 engages the pair of spaced cam followers 27 mounted on each of the cracker assemblies 5 as the turret 1 carries the cracker assemblies 5 to the chord cam 8. This movement of the cracker assemblies 5 on the turret 1 under the cam 8 causes both of the cam followers 27 on each cracker assembly 5 to be carried into engagement with the cam 8. This swings and holds the cracker assemblies 5 perpendicular to the cam 8. Simultaneously, the cracker assemblies 5 on the mounts 7 are forced inwardly of the turret 1 compressing the coil springs 24 on the guide pins 21. Both cam followers 27 are held tightly against the chord cam 8 so that the group or cracker assemblies 5 opposite the conveyor 4 are held in the position illustrated in FIG. 1 parallel to each other and on a straight line parallel to the rows of eggs 3 on the row conveyor 4.

The position of the alignment or chord cam 8 is set so that the cracker assemblies 5 opposite the row conveyor 4 are parallel to one another and are in a straight line and so that the egg receiving supports 9 of each cracker assembly 5 are positioned in close proximity to the endmost roller position on the roller conveyor 4, as seen in FIG. 3. This action provides a continuing alignment of the cracker assemblies 5 so that the appropriate number of assemblies 5 is always ready to receive eggs 3 from the row conveyor 4 when the timing drive ratchet 33 operates to dump a row of eggs onto the turret.

The trailing or righthand end of the chord cam 8 is shaped to permit each of the cracker assemblies 5 to return to its normal operating position under the force of the compressed coil springs 24 as the cracker assemblies are moved beyond the loading position. As the cracker assemblies 5 leave the chord cam 8, the endmost portion 36 of cam 8 is shaped to engage both of the cam followers 27 with the cracker assemblies 5 in their normal radially aligned positions on the turret 1. The ball plungers 25 reengage the turret detents 37 to insure a correct realignment and to releasably hold the mounts 7 and their attached cracker and separator assemblies 2 in position.

It will be seen that an improved method and means have been described for transferring rows of articles from one support to another where the alignment of the rows may differ between supports. In particular, an improved method and means have been disclosed for transferring straight rows of articles from a row conveyor to a turret-type or rotating circular support. The new method and means provide for a relatively simple and effective transfer in place of the more complex devices presently used for making this type of transfer. The method and means may be readily incorporated into new machine designs or used in combination with minor modifications in existing machines.

The invention permits an effective combination to be made of efficient turret-type processing machinery with high speed easily synchronized article feeding row conveyors.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In an egg processing means having processing heads mounted in a circle on a circular turret for rotation around a central turret support improved means for feeding a straight row of eggs to a number of adjacent heads on the turret comprising:

Means for pivotally and slidably mounting the processing heads on said turret;

Means for normally holding said processing heads in a radial alignment; and adjusting means for temporarily moving the heads of said number of adjacent heads into a straight line by imparting swinging and sliding motion to the heads so that a desired number of said heads are placed in a straight line to receive said eggs from said means for feeding 2. The means as claimed in claim 1 in which said adjusting means further comprises an elongated aligning cam and cam followers on each of said processing heads positioned for sliding engagement with said cam.

3. The machine as claimed in claim 1 in which said article supports comprise egg cracker assemblies.

4. The means as claimed in claim 1 in which said processing heads comprise egg cracker and separator units.

5. The egg processing means as claimed in claim 1 in which said egg processing heads comprise egg cracker and separator units.

6. The egg processing means as claimed in claim 1 which further comprises detent means positioned on said turret for engaging said processing heads for releasably holding them in the said straight line.

7. The processing means as claimed in claim 1 which further comprises a row conveyor for feeding the straight rows of eggs to said processing heads.

8. In an egg processing means having egg breaking heads mounted in a circle on a circular turret for rotation around a central turret support improved means for feeding a straight row of eggs to a number of adjacent breaking heads on the turret comprising:

means for pivotally and slidably mounting the heads on said turret;

means for normally holding said breaking heads in a radial alignment;

adjusting means comprising elongated stationary cams for temporarily moving the heads of said number of adjacent heads into a straight line by imparting swinging and sliding motion to the heads, so that a desired number of said heads are placed in a straight line to receive said, and said means for feeding including eggs from said means for feeding a row conveyor for moving eggs into said adjacent and adjusted heads.

9. The means as claimed in claim 8 which further comprises detent means positioned on said turret for releasably engaging said egg breaking heads or releasably holding them in said straight line.

* * * * *